United States Patent
Gallo et al.

(10) Patent No.: US 7,251,718 B2
(45) Date of Patent: Jul. 31, 2007

(54) APPARATUS, SYSTEM, AND METHOD FOR MANAGING ADDRESSES AND DATA STORAGE MEDIA WITHIN A DATA STORAGE LIBRARY

(75) Inventors: Frank David Gallo, Tucson, AZ (US); Brian Gerard Goodman, Tucson, AZ (US); Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 10/954,117

(22) Filed: Sep. 29, 2004

(65) Prior Publication Data

US 2006/0069844 A1 Mar. 30, 2006

(51) Int. Cl.
*G06F 12/00* (2006.01)

(52) U.S. Cl. .............................. 711/202; 711/207

(58) Field of Classification Search ............... 711/202, 711/207

See application file for complete search history.

(56) References Cited

U.S. PATENT DOCUMENTS

| | | | |
|---|---|---|---|
| 5,870,732 A * | 2/1999 | Fisher et al. ............... 707/1 |
| 5,963,971 A | 10/1999 | Fosler et al. ............... 711/114 |
| 6,031,798 A * | 2/2000 | James et al. ............... 369/30.28 |
| 6,044,442 A * | 3/2000 | Jesionowski ............... 711/153 |
| 6,328,766 B1 | 12/2001 | Long ............................ 718/8 |
| 6,338,006 B1 | 1/2002 | Jesionowski et al. ....... 700/214 |
| 6,480,905 B1 | 11/2002 | Jesionowski et al. ....... 710/8 |
| 2006/0020569 A1* | 1/2006 | Goodman et al. ............ 707/1 |

* cited by examiner

*Primary Examiner*—Reba I. Elmore
(74) *Attorney, Agent, or Firm*—Kunzler + McKenzie

(57) ABSTRACT

An apparatus, system, and method are disclosed for managing physical addresses of data storage media within a data storage library. The library maintains a data table of storage slots and the media stored in those slots. The data table may contain addresses for storage slots that are not physically present or accessible within the library. Hardware such as storage slots may be added or removed without causing an inconsistency within the data table of assigned addresses. Addresses may be recorded as the particular frame, column, and row that describe the location of a particular storage slot. Each data storage media is associated with a particular host. The data table of the library maintains a record of data storage media and the host affinity the media corresponds to.

30 Claims, 9 Drawing Sheets

APPARATUS, SYSTEM, AND METHOD FOR MANAGING ADDRESSES AND DATA STORAGE MEDIA WITHIN A DATA STORAGE LIBRARY

BACKGROUND OF THE INVENTION

1. Field of the Invention

This invention relates to managing addresses of data storage media and more particularly relates to managing physical addresses of data storage media within a data storage library.

2. Description of the Related Art

Automated data storage libraries are known for providing cost effective storage and retrieval of large quantities of data. The data in automated data storage libraries is stored on data storage media that are, in turn, stored on storage shelves or the like inside the library in a fashion that renders the media, and its resident data, accessible for physical retrieval. Such media is commonly termed "removable media." Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, Compactflash™, Smartmedia™, Memory Stick™, etc.), or other suitable media.

Typically, the data stored in automated data storage libraries is resident on data storage media that is contained within a cartridge and referred to as a data storage media cartridge. An example of a data storage media cartridge that is widely employed in automated data storage libraries for mass data storage is a magnetic tape cartridge.

In addition to data storage media, automated data storage libraries typically contain data storage drives that store data to, and/or retrieve data from, the data storage media. The transport of data storage media between data storage shelves and data storage drives is typically accomplished by one or more robot accessors (hereinafter termed "accessors"). Such accessors have grippers for physically retrieving the selected data storage media from the storage shelves within the automated data storage library and transport such media to the data storage drives by moving in the X and Y directions.

Libraries typically use internal addressing to identify cartridge slot locations within the library. We shall refer to library internal addressing as a library address or a physical address. Libraries typically present cartridge slot locations to host applications by way of an address, commonly referred to as an element address. We shall refer to the hosts view of library reported addressing as a host address or a logical address. In some designs, the library address and the host address for any particular cartridge location is one in the same. For example, all physical storage shelves in the library may be assigned an address beginning with a starting address and incrementing by one for each sequential slot in the library. This address information is presented to host applications that in turn send commands to the library to move cartridges based on the address information. In some designs, the library address and the host address for any particular cartridge location is different. For example, the library may be partitioned into several logical libraries. Each logical library may be attached to different host computers such that the host computer associated with one logical library has no awareness of any other logical libraries and associated cartridges. In this example, cartridges associated with one logical library may have the same logical address as cartridges associated with another logical library even though the library maintains unique physical addresses for each cartridge in the library. Virtualization of the storage slots in a library is another example of why the library address and the host address may not be the same address, for any particular cartridge location in the library. The library keeps a map of host (logical) storage addresses to actual library (physical) addresses when performing move operations and when reporting cartridge locations to a host application. The mapping of the logical address to the actual physical address must be maintained in a consistent fashion by the library so as to ensure proper movement of the intended cartridge. As described above, a storage slot may be mapped between a host (logical) address and a library (physical) address. In addition, a host address may only be mapped to an occupied library address wherein library virtualization is only concerned with where actual cartridges are located and any empty slot is arbitrarily chosen by the library for placing media. Herein, mapping addresses may refer to a mapping of storage slots that contain media, storage slots that do not contain media and combinations thereof.

Commands from multiple hosts to move cartridges can be on the library work queue awaiting execution as the library handles the incoming commands. As one command completes, a subsequent command from the queue can be dispatched. All queued commands and any additional incoming commands are built and performed based on the logical to physical mapping. In libraries, such as the IBM 3584 Automated Tape Library, it is possible to add or remove storage to or from a column in a manner that would affect the previous logical to physical mapping of the storage addresses. This may cause the logical to physical mapping of the library to no longer be consistent with the new physical layout of the library. As a result, any attempt to execute cartridge movement commands could have unexpected results. The cause of this inconsistency between the queued commands and the new physical layout is that current storage libraries assign physical element addresses based on the actual physical slots in the library. Additionally, physical addresses within the data storage library are unable to remain consistent if components comprising the library, commonly known as frames, are rearranged, inserted, or removed from the storage library.

Further, data storage libraries are often dynamically partitioned into logical libraries, and each logical library is associated with a different host application. The host application may be software running on a host machine so that each host application has access to the storage and the drives of their corresponding logical library. Due to security concerns, media, such as cartridges, are not shared between different host applications. The logical/physical mapping may be abstracted further to include virtualization of the storage slots. Before the virtualization addressing occurs, cartridges may be associated with a particular host based on the physical location of the cartridge in the library. After the virtualization addressing process has occurred, such an association between cartridge and host is no longer based on physical locations of cartridges in a library. Instead, the association may be based on an identifier inherent to the cartridge.

Current static partitioned libraries store a table in non-volatile storage that provides the physical addresses associated with a particular host. However, a specific element for statically partitioned libraries will likely not be associated with the same physical address when a library converts to dynamic partitioning and employs the virtualization addressing method. Once configuration to dynamic partitioning is complete, such locations in the table will no longer correlate to the physical address upon which the table was built.

From the foregoing discussion, it should be apparent that a need exists for an apparatus, system, and method that manages physical addresses of data storage media before and after virtualization addressing methods have been applied. Beneficially, such an apparatus, system, and method would enable multiple hosts to access data storage media within the library after virtualization addressing has occurred.

SUMMARY OF THE INVENTION

The present invention has been developed in response to the present state of the art, and in particular, in response to the problems and needs in the art that have not yet been fully solved by currently available data storage libraries. Accordingly, the present invention has been developed to provide an apparatus, system, and method for managing physical addresses of data storage media that overcome many or all of the above-discussed shortcomings in the art.

The apparatus to manage addressing of data storage media is provided with a logic unit containing a plurality of modules configured to functionally execute the necessary steps of managing data storage media addresses. These modules in the described embodiments include a data storage library configured to store the data storage media, a library controller configured to receive commands from at least one external host, and a data table configured to record a mapping of host addresses to library addresses within the data storage library. The apparatus further includes an assignment module configured to assign an address to existing and non-existing storage locations within the library, wherein a change to the existence of one or more storage locations does not affect the mapping of the host address to the library address. The assignment module is further configured to assign the data storage media with a particular external host.

The apparatus, in one embodiment, is configured to assign a physical address to each potential storage slot within the data storage library. The data storage library may comprise one or more frames that comprise columns and rows of storage slots for data storage media. The assignment module may assign an address location for discrete data storage media based on a particular frame, column, and row. The assignment module may be configured to assign a unique frame identifier as the address of the frame. The apparatus is further configured, in one embodiment, to receive commands to store or access a particular data storage media within the data storage library.

A system of the present invention is also presented to manage physical addresses of data storage media. In particular, the system, in one embodiment, includes a data storage library configured to store the data storage media and one or more external hosts configured to provide commands to store or access the data storage media.

The system may further include a data table configured to record a mapping of a host address to a library address within the data storage library. The system may also include a controller configured to assign addresses to existing and non-existing storage locations within the data storage library, wherein a change to the existing storage locations does not affect the mapping of the host address to the library address. The controller may further assign an address to each potential storage slot comprising the data storage library based on the frame, column, and row of the location of the particular storage slot. The controller may be configured to assign a unique frame identifier as the address of the particular frame within the data storage library.

A method of the present invention is also presented for managing physical addresses of data storage media within a data storage library. The method in the disclosed embodiments substantially includes the steps necessary to carry out the functions presented above with respect to the operation of the described apparatus and system. In one embodiment, the method includes storing data storage media within the data storage library. The method also may include mapping a host address to a library address within the data storage library and assigning an address to existing and non-existing storage locations within the data storage library, wherein a change to the existence of one or more storage locations does not affect the mapping of the host address to the library address.

In a further embodiment, the method includes assigning the data storage media with a particular external host and assigning an address to components such as frames that comprise the data storage library.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
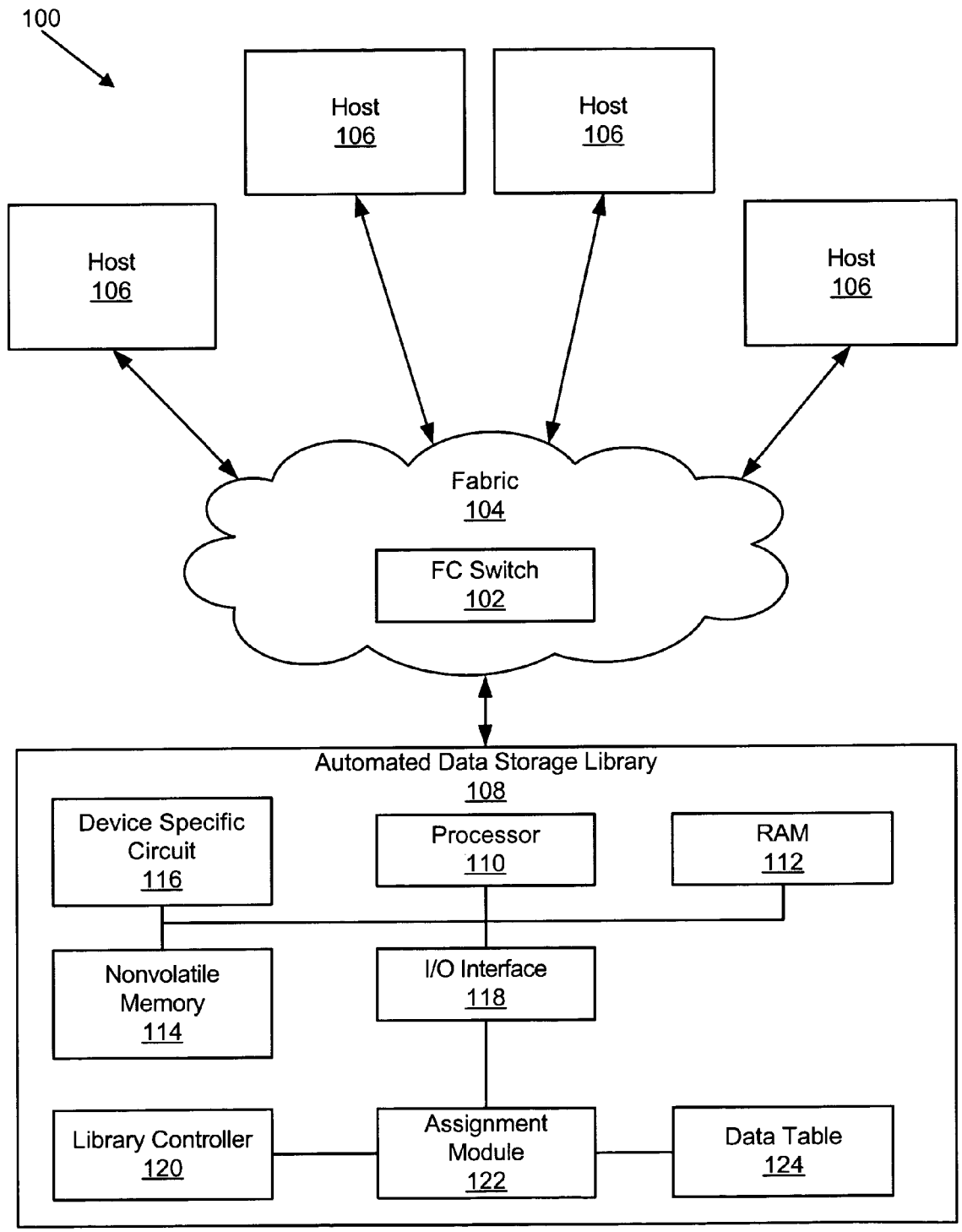
FIG. 1 is a schematic block diagram illustrating one embodiment of a storage area network in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 is a schematic block diagram graphically illustrating one embodiment of a storage area network (SAN) 100 in accordance with the present invention. In one embodiment, the SAN 100 comprises a switch-access-network in which at least one Fibre Channel (FC) switch 102 implements a FC switching fabric 104. In a further embodiment, the SAN 100 may be implemented using Small Computer Systems Interface (SCSI) protocol running over the FC fabric 104. Alternatively, the SAN 100 may be implemented over other protocols, such as, but not limited to, Infiniband FICON, TCP/IP, Ethernet, Gigabit Ethernet, or iSCSI. In addition, there may not be any SAN fabric 104. In this case, the library may be directly attached to the host computer(s) 106 through a SCSI interface, Fibre Channel interface, iSCSI interface, or any other interface known to those of skill in the art.

In one embodiment, a plurality of host machines 106 is coupled to the fabric 104. The FC switch 102 may be configured to route I/O requests from the host 106 to an automated data storage library 108. Alternatively, the I/O requests may be routed through the Internet (not shown) using standard TCP/IP. The automated data storage library 108 may include a processor 110, RAM (Random Access Memory) 112, a nonvolatile memory 114, at least one device specific circuit 116, and an I/O interface 118. Alternatively, the RAM 112 and/or nonvolatile memory 114 may be embedded within the processor 110 as could the device specific circuit 116 and the I/O interface 118.

The processor 110 may be implemented as an off the shelf microprocessor, custom processor, Field Programmable Gate Array (FPGA), Application Specific Integrated Circuit (ASIC), discrete logic, etc. The RAM 112 may be configured to hold variable data, stack data, executable instructions, etc. The nonvolatile memory 114 may comprise any type of nonvolatile memory such as EEPROM, flash PROM, battery backup RAM, hard disk drive, or the like. The nonvolatile memory 114 is configured to hold the executable firmware and any nonvolatile data. The I/O interface 118 may be configured to interface the processor 110 with external devices (not shown). In one embodiment, the I/O interface 118 may comprise serial interfaces such as RS-232 or USB (Universal Serial Bus), SCSI, Fibre Channel, etc. In a further embodiment, the I/O interface 118 may comprise a wireless interface such as RF or Infrared.

The device specific circuit 116 provides additional hardware to enable the automated data storage library 108 to perform unique functions such as motor control of a cartridge gripper, etc. Control of such functions within automated storage libraries 108 is well known to those skilled in the art and will not be given further discussion herein. The library 108 may comprise a library controller 120 that receives commands from at least one of the external hosts 106. The library 108 may further comprise an assignment module 122 that provides a physical address to existing and non-existing storage locations within the data storage library 108. The addresses assigned by the assignment module 122 are stored in a data table 124. The assignment module 122 and the data table 124 will be discussed in greater detail below with reference to FIGS. 6 and 7.

Figure 2:
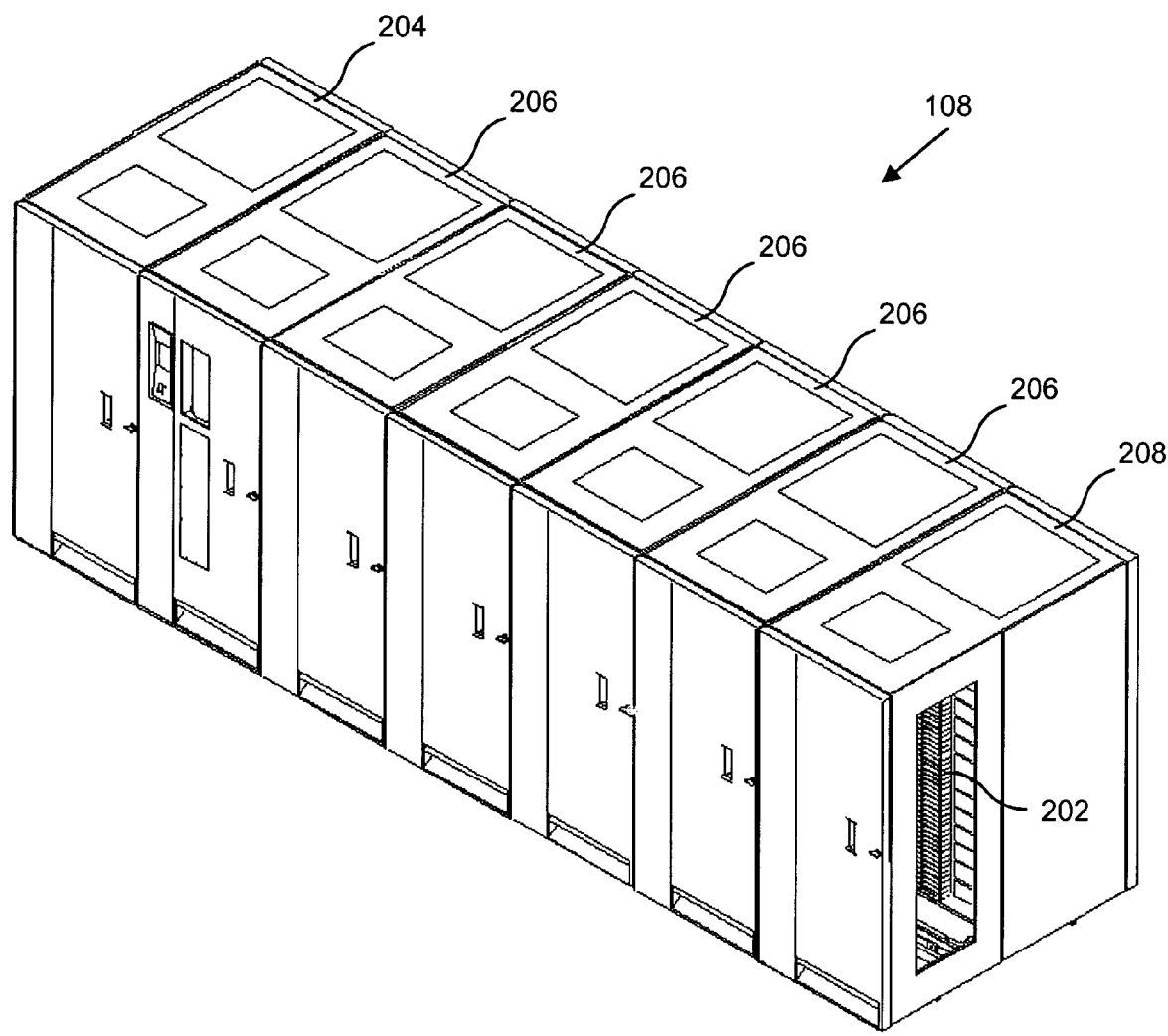
FIG. 2 is an isometric view of an automated data storage library adaptable to implement an embodiment of the present invention.

FIG. 2 illustrates the automated data storage library 108 which stores and retrieves data storage cartridges containing removable storage media in storage cells 202. It is noted that references to "removable storage media" herein also refer to data storage cartridges and, for purposes herein, the two terms are used synonymously. An example of an automated data storage library 108 which may implement the present invention, and has a configuration as depicted in FIG. 1, is the IBM 3584 UltraScalable Tape Library.

The library 108 of FIG. 2 comprises a left hand service bay 204, one or more storage frames 206, and a right hand service bay 208. A service bay 204, 208 is characterized by its designation as the location in which an accessor may be temporarily located or positioned when not in use. Having a service bay 204, 208 at each end of the library 108 allows multiple accessors to each have full access to all of the storage cells 202 and drives within the intermediate storage frames 206. For example, one accessor may be temporarily located or positioned out of the way in the left service bay 204 while a second accessor accesses a drive in the storage frame 206 adjacent to the left service bay 204. All of the service bays 204, 208 and storage frames 206 may be referred to as frames 204-208. As will be discussed, a frame 204-208 may comprise an expansion component of the library 108. Frames 204-208 may be added or removed to expand or reduce the size and/or functionality of the library 108. Frames 204-208 may comprise additional storage cells 202, drives, import/export stations, accessors, operator panels, etc, as will be discussed below.

Figure 3:
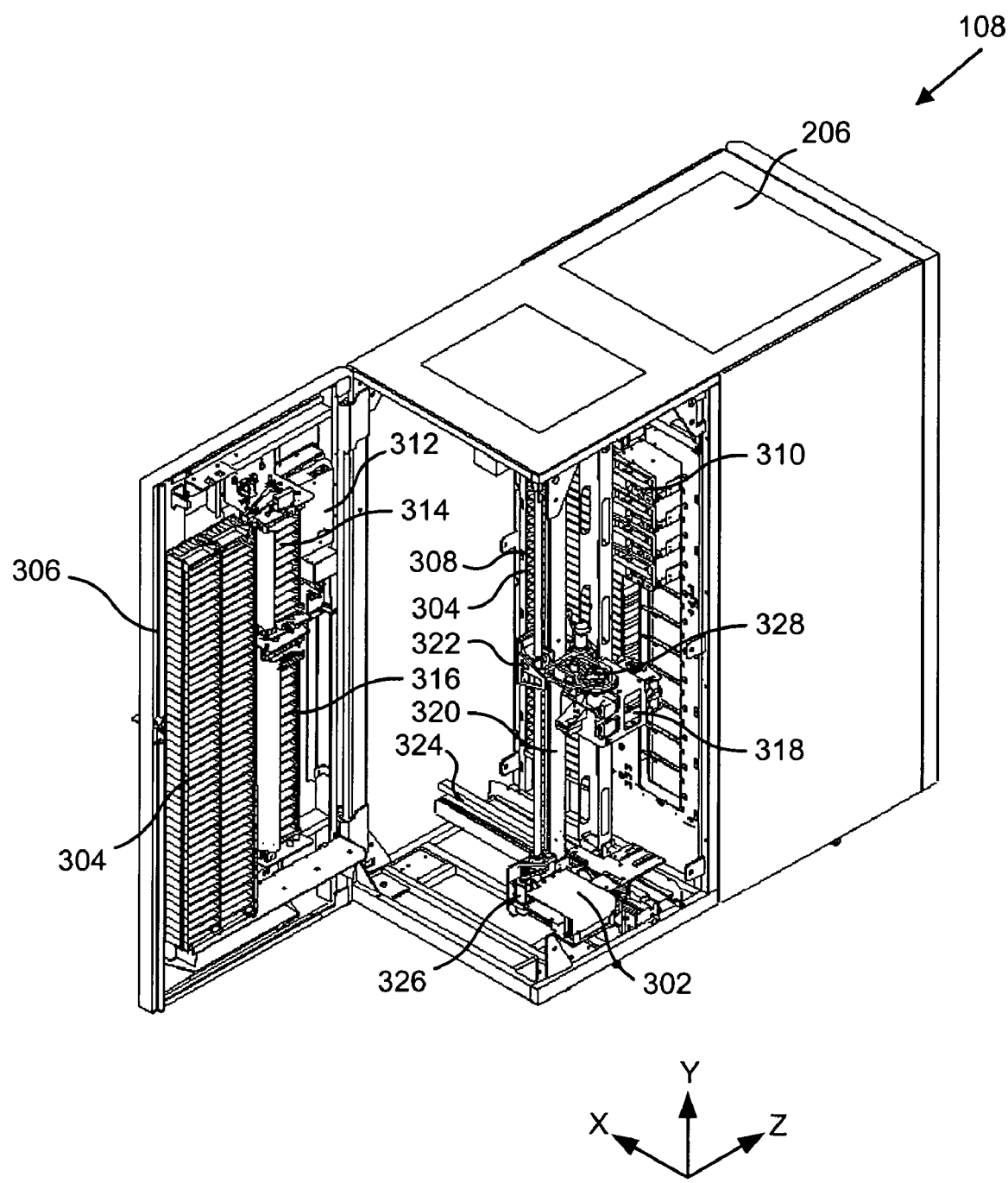
FIG. 3 is an isometric view of an automated data storage library adaptable to implement an embodiment of the present invention.

FIG. 3 shows an example of a single storage frame 206, which is contemplated to be the minimum configuration of an automated data storage library 108. In this minimum configuration, there is only a single accessor 302 (i.e., there are no redundant accessors) and there are no service bays 204, 208. The library 108 is arranged for accessing data storage media in response to commands from at least one external host system (not shown). In one embodiment, the library 108 comprises a plurality of storage shelves or slots 304 on front wall 306 and rear wall 308 for storing data storage cartridges that contain data storage media; at least one data storage drive 310 for reading and/or writing data with respect to the data storage media; and the illustrated accessor 302 for transporting the data storage media between the plurality of storage shelves 304 and the data storage drive(s) 310. Both the storage cells 304 and the storage drives 310, as well as other locations suitable for holding data storage media, may be referred to as "data storage locations." The data storage drives 310 may be optical disk drives, magnetic tape drives, or other types of data storage drives as are used to read and/or write data with respect to the data storage media.

The storage frame 206 may optionally comprise an operator panel 312 or other user interface, such as a web-based interface, which allows a user to interact with the library 108. The storage frame 206 may optionally comprise an upper I/O station 314 and/or a lower I/O station 316, which allows data storage media to be inserted into the library and/or removed from the library without disrupting library operation. For example, a user may insert a storage media cartridge into one of the I/O stations 314, 316 while the front wall 306 of the storage frame 206 is closed. The I/O stations 314, 316 also may be referred to as "data storage locations." Further embodiments of the library 108 also may comprise one or more service bays 204, 208 and/or additional storage frames 206, each having storage cells 304 accessible by an accessor 302.

As described above, each of the storage frames 206 may be configured with different components depending upon the intended function. One configuration of storage frame 206 may comprise storage shelves 304, data storage drive(s) 310, and other optional components to store and retrieve data from the data storage cartridges. In a further embodiment, the storage frame 206 may be converted to a service bay 204, 208 within a larger automated data storage library 108. Conversely, a service bay 204, 208 may be converted into a storage frame 206, such as when additional frames 204-208 are added onto an existing library 108. The new frames 206 may be bolted onto the end of the existing service bay 204,208. The existing service bay 204,208 then may be converted into a storage frame 206 and filled with storage cells 304, drives 310, and the like. Alternatively, a service bay 204, 208 may already contain storage shelves 304 and there may be no conversion required.

In one embodiment, the accessor 302 comprises a gripper assembly 318 for gripping one or more data storage media and transporting the data storage media among the storage shelves 304 and drives 310. The gripper assembly 318 is mounted to a vertical rail 320 (also referred to as a "Y" rail) and may be transported vertically on the vertical rail 320 via a Y rail drive 322. The vertical rail 320 and gripper assembly 318, in turn, may be transported horizontally along a horizontal rail 324 (also referred to as an "X" rail) by an X rail drive 326. If multiple accessors 302 are installed in a single library 108, they may each run on an independent X rail(s) 324 or may run on the same X rail(s) 324. In a further embodiment, the gripper assembly 318 may rotate approximately 180 degrees via a rotational drive 328. In this way, the gripper assembly 318 may access the storage shelves 304 and I/O stations 314, 316 on the front wall 306, as well as the storage cells 304 and drives 310 on the rear wall 308.

Figure 4:
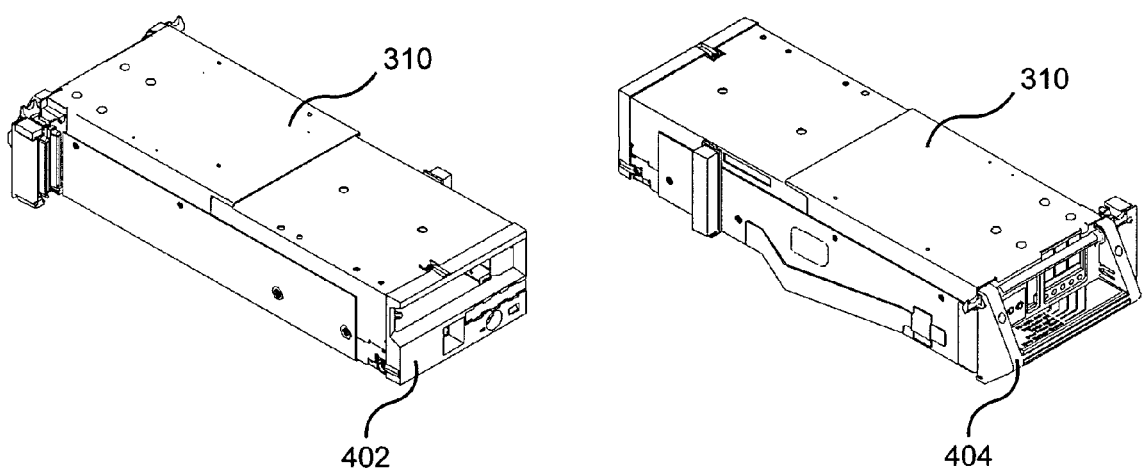
FIG. 4 is an isometric view of the front and rear of a data storage drive that may be used in an automated data storage library to store and/or retrieve data.

FIG. 4 illustrates one embodiment of a data storage drive 310 that may be installed in the automated data storage library 108 of FIG. 1. Specifically, FIG. 4 depicts the front 402 and rear 404 of a data storage drive 310. In the depicted embodiment, the data storage drive 310 comprises a removable media Linear Tape Open (LTO) tape drive mounted in a drive canister. The data storage drive 310 may comprise any removable storage media drive such as, but not limited to, magnetic or optical disk drives, electronic media drives, or other computer readable removable media drives.

Figure 5:
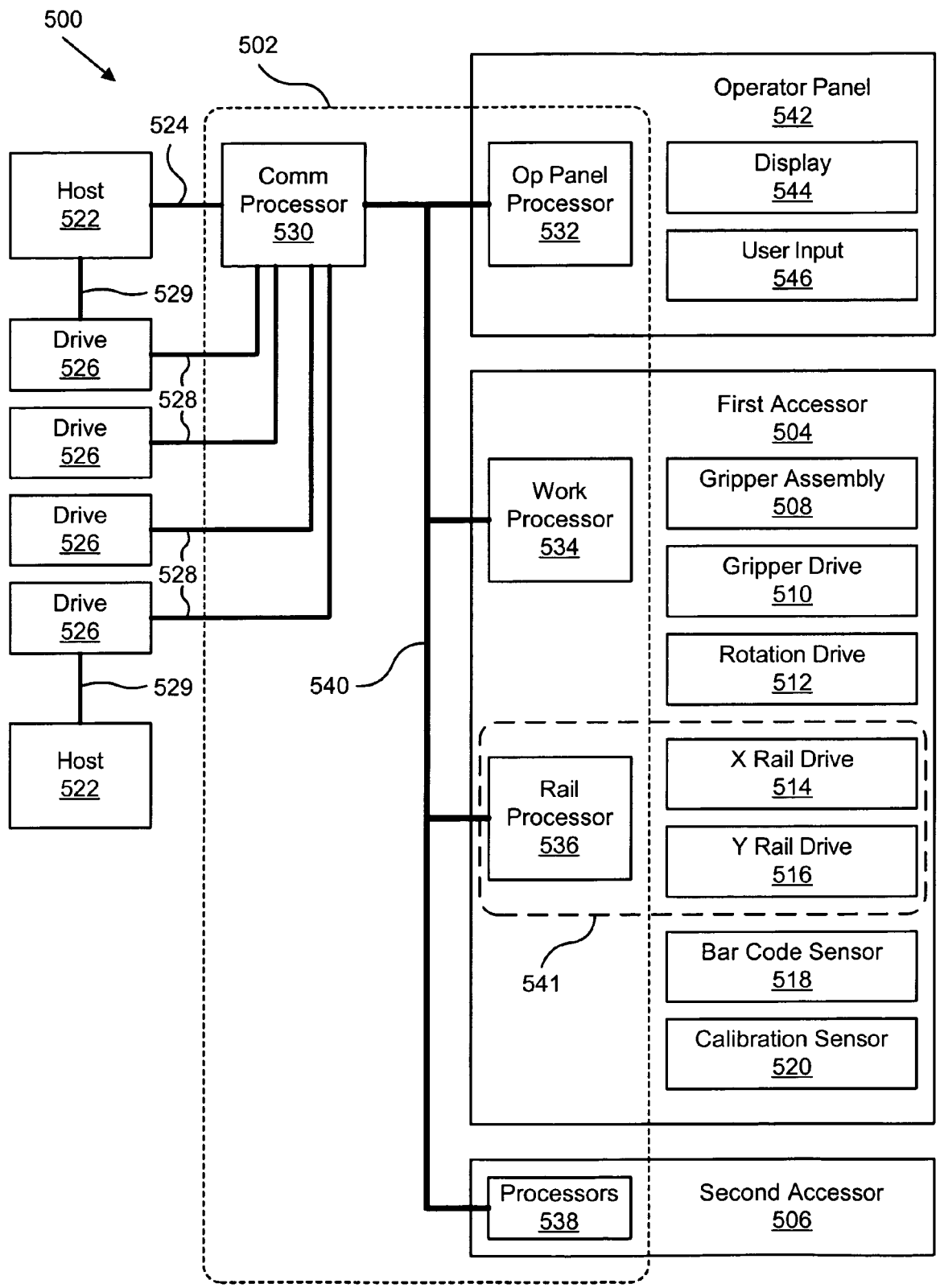
FIG. 5 is a schematic block diagram graphically illustrating one embodiment of a distributed control system within an automated data storage library adaptable to implement an embodiment of the present invention.

FIG. 5 illustrates an embodiment of an automated data storage library 500 that is substantially similar to the automated data storage library 108 of FIG. 1. The illustrated library 500 employs a distributed control system 502 that includes a plurality of processor nodes. An example of an automated data storage library 500 which may implement the distributed control system 502 is the IBM 3584 UltraScalable Tape Library. For a more detailed background of certain embodiments of a distributed control system 502 incorporated in an automated data storage library 500, refer to U.S. Pat. No. 6,356,803 entitled "Automated Data Storage Library Distributed Control System," which is incorporated herein by reference.

While the automated data storage library 500 is described as employing a distributed control system 502, the present invention may be implemented in various automated data storage libraries 500 regardless of control configuration, such as, but not limited to, an automated data storage library 500 having one or more library controllers that are not distributed. In further embodiments of the invention, the distributed control system 502 may be distributed among various components of a library 500. For example, components may be located within the service bays 204, 208 or the storage frames 206. Still further, individual components may be located on the operator panel 312, the accessors 302, and so forth. A library controller may comprise one or more dedicated controllers of a prior art library or it may comprise a processor node of a distributed control system, such as the distributed control system depicted in FIG. 5. In addition, a library controller may comprise more than one processor node, such as a distributed control library that employs multiple processor nodes to accomplish part or all of the library functionality. For example, in FIG. 5, the library controller may comprise communication processor node 530, work processor node 534, rail processor 536, etc. Herein, library controller may comprise a single processor or controller or it may comprise multiple processors or controllers.

The illustrated library 500 also comprises a first accessor 504 and a second accessor 506. The first accessor 504 and second accessor 506 are substantially similar to the accessor 302 of FIG. 3 and its features. As shown, the first accessor 504 comprises a gripper assembly 508 as described above, a gripper drive 510, a rotation drive 512, an X rail drive 514, and a Y rail drive 516. Additionally, the first accessor 504 includes a bar code sensor 518 and a calibration sensor 520. The bar code sensor 518 also may be referred to as a reading system. The second accessor 506 is substantially similar to the first accessor 504; however, for clarity and ease of description, the components of the second accessor 506 are not shown.

In the exemplary library 500, the first accessor 504 and the second accessor 506 move their respective gripper assemblies 508 in at least two directions, called the horizontal "X" direction and vertical "Y" direction, as described above, to retrieve and grip, or to deliver and release a data storage cartridge (hereinafter "cartridge") at the storage cells 304 and to load and unload the cartridges at the data storage drives 310.

In one embodiment, the automated data storage library 500 receives operational commands from one or more host systems 522. The host systems 522, such as host servers, communicate with the library 500 directly, e.g., on a communications channel 524 or through one or more control ports (not shown). In another embodiment, the host systems 522 may communicate with the communication processor node 530 through one or more data storage drives 526 on one or more communication channels 528, 529. The data storage drives 526 are substantially similar to the data storage drives 310 described above.

The hosts 522 may be connected to the data storage drives 526 via a communication channel 529. In one embodiment, the communication channel 529 may be a small computer system interface (SCSI) bus. Alternately, the communication channel 529 may be a Fibre Channel bus, which is a high-speed serial data interface that allows transmission over greater distances than the SCSI bus systems. Still further, the communication channel 529 may be an iSCSI interface or any other interface known to those of skill in the art. In one embodiment, the data storage drives 526 may be in close proximity to the communication processor node 530 and the communication channel 528 may employ a short distance communication scheme, such as SCSI, or a serial connection, such as RS-422. The data storage drives 526 are also individually coupled to the communication processor node 530 by means of communication channels 528. Alternatively, the data storage drives 526 may be coupled to the communication processor node 530 through one or more networks, such as a common bus network. As is known to those of skill in the art, various communication arrangements may be employed for communication among the hosts 522, the data storage drives 526, and the communication processor node 530.

The host systems 522 are configured to provide operational commands to access a particular data storage cartridge and move the cartridge, for example, between the storage cells 304 and the data storage drives 526. The commands are typically logical commands identifying the cartridge and/or logical locations for accessing the cartridge. The terms "commands" and "work requests" are used interchangeably herein to refer to such communications from the host system 522 to the library 500 that are intended to result in accessing a particular cartridge within the library 500.

In one embodiment, the exemplary library 500 is controlled by the distributed control system 502. The distributed control system 502 receives the logical commands from one or more hosts 522, determining the required actions, and converting the actions to physical movements of the first accessor 504 and/or second accessor 506. In the illustrated embodiment, the distributed control system 502 comprises a plurality of processor nodes, each having one or more processors. Specifically, the distributed control system 502 includes a communication processor node 530, an operator panel processor node 532, a work processor node 534, and a rail processor node 536. The distributed control system 502 may further include additional processor nodes 538, similar to the communication processor node 530, operator panel processor node 532, work processor node 534 and the rail processor node 536.

In one embodiment, the communication processor node 530 may be located in a storage frame 206. The communication processor node 530 provides a communication link for receiving the operational commands from a host 522, either directly or through the drives 526, or via at least one external interface, e.g., coupled to communication channel 524. The communication processor node 530 may additionally provide a communication link 528 for communicating with the data storage drives 526. In one embodiment, the communication processor node 530 may be located in a storage frame 206, for example, close to the data storage drives 526.

In a further embodiment of the distributed control system 502, one or more work processor nodes 534 are provided, which maybe located at the first accessor 504. The work processor nodes 534 are coupled to the communication processor node 530 via a communications network 540. Each work processor node 534 may respond to received commands that are broadcast to the work processor nodes 534 from any communication processor node 530. Additionally, the work processor nodes 534 also may direct the operation of the accessors 504, 506, providing motion control or move commands, for example, to the gripper assembly 508, the gripper drive 510, the rotation drive 512, and the rail processor node 536.

The rail processor node 536 also may be coupled to the network 540. The rail processor node 536 is responsive to the move commands received from the work processor node 534, operating the X rail drive 514, and the Y rail drive 516 to position the gripper assembly 508. Together, the rail processor node 536, the X rail drive 514, and the Y rail drive 516 may be referred to as an "XY system" 541.

In the depicted embodiment, an operator panel processor node 532 is provided at the optional operator panel 542. The operator panel processor node 532 is configured to provide an interface for communicating between the operator panel 542 and the communication processor node(s) 530, the work processor node(s) 534, and the rail processor node(s) 536. In one embodiment, the operator panel 542 also comprises a display 544 and a user input module 546. Together, the display 544 and the user input module 546 are configured to receive commands from a user and display system information.

As described above, a communication network 540 is provided within the distributed control system 502, coupling the various processor nodes 530-538. In one embodiment, the communication network 540 may comprise a robust wiring network, such as the commercially available CAN (Controller Area Network) bus system, which is a multi-drop network, having a standard access protocol and wiring standards. Other types of networks, such as Ethernet, or a wireless network system, such as RF or infrared, may be employed in the library 500 as is known to one of skill in the art. In addition, multiple independent connections and/or communication networks 540 may also be used to couple the various processor nodes 530-538.

An automated data storage library 500 typically comprises one or more controllers to direct the operation of the automated data storage library 500. Host computers 522 and data storage drives 526 typically comprise similar controllers. A controller may take many different forms and may comprise, for example but not limited to, an embedded system, a distributed control system, a personal computer, or a workstation. As used herein, the term "controller" is intended in its broadest sense as a device that contains at least one processor, as such term is defined herein.

Although not depicted herein, a typical controller includes a processor, an electronic memory device such as RAM (Random Access Memory), a nonvolatile memory device, device specific circuits, and I/O interface (refer to FIG. 1). Alternatively, the RAM and/or nonvolatile memory may be contained in the processor, as could the device specific circuits and the I/O interface. The processor may comprise, for example, an off-the-shelf microprocessor, custom processor, FPGA (Field Programmable Gate Array), ASIC (Application Specific Integrated Circuit), discrete logic, or the like.

The RAM (Random Access Memory) is typically used to hold variable data, stack data, executable instructions, and the like. The nonvolatile memory may comprise any type of nonvolatile memory such as, but not limited to, EEPROM (Electrically Erasable Programmable Read Only Memory), flash PROM (Programmable Read Only Memory), battery backup RAM, and hard disk drives. The nonvolatile memory is typically used to hold the executable firmware and any nonvolatile data. The I/O interface comprises a communication interface that allows the processor to communicate with devices external to the controller. Examples may comprise, but are not limited to, serial interfaces such as RS-232, USB (Universal Serial Bus), Ethernet, SCSI (Small Computer Systems Interface), and so forth.

The device specific circuits provide additional hardware to enable the controller to perform unique functions such as, but not limited to, motor control of a cartridge gripper assembly 508. The device specific circuits may comprise electronics that provide, by way of example but not limitation, Pulse Width Modulation (PWM) control, Analog to Digital Conversion (ADC), Digital to Analog Conversion (DAC), etc. In addition, all or part of the device specific circuits may reside outside the controller.

Figure 6:
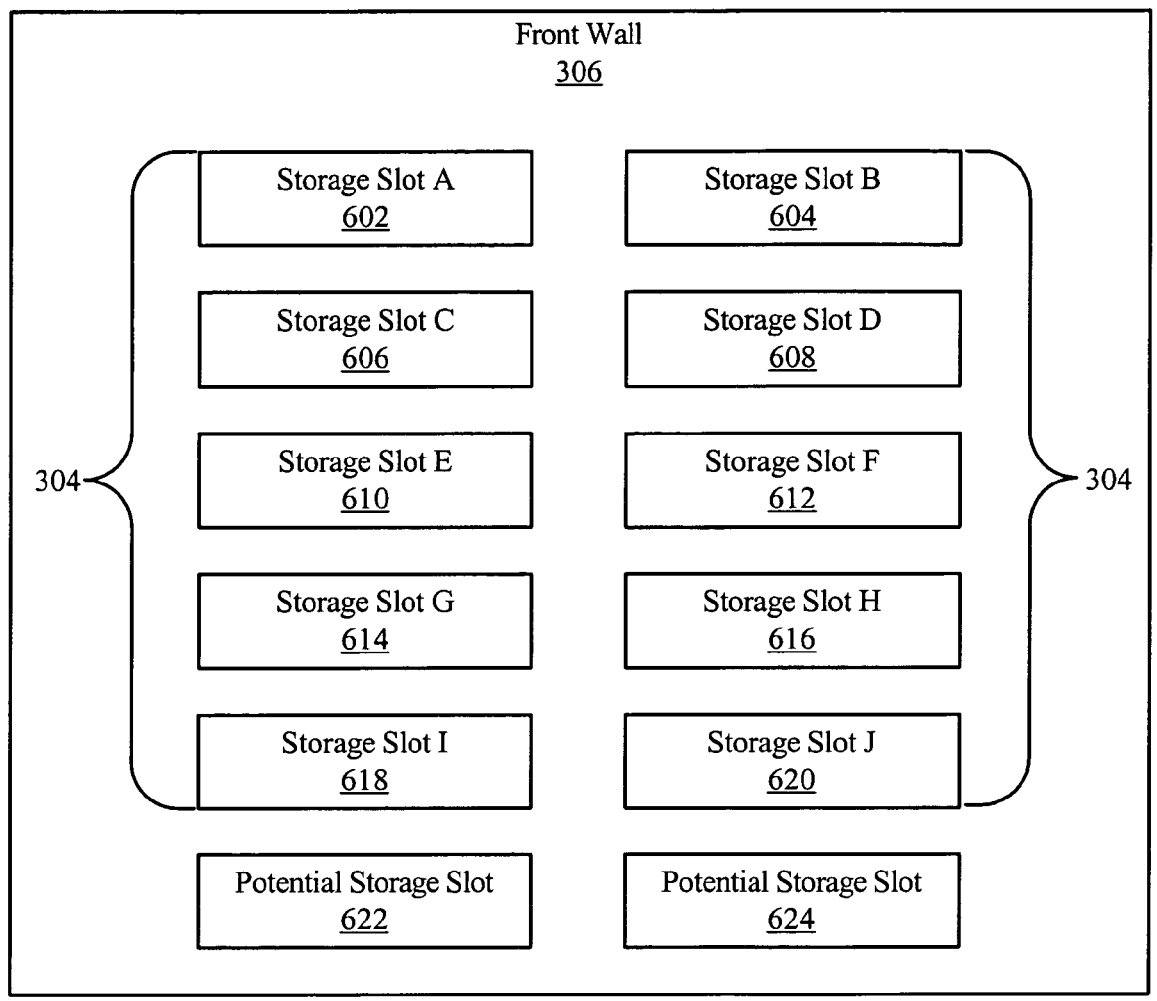
FIG. 6 is a schematic block diagram illustrating one embodiment of storage slots within a frame of a data storage library.

FIG. 6 is a schematic block diagram illustrating one embodiment of a front wall 306 of a single storage frame 206 as previously explained in reference to FIG. 3. A plurality of storage slots 304 may be attached to the front wall 306. Each individual storage slot within the plurality 304 may be configured to store data storage media. Additionally, each individual storage slot is assigned a particular physical address and may have a particular logical address for host interaction with the library. In one embodiment, the assignment module 122 assigns an address to each individual storage slot. The assignment module 122 may further assign an address to non-existent, or potential, storage slots. For example, a storage slot A 602 may be assigned the physical address '001' and the logical address '401', a storage slot B 604 may be assigned the physical address '002' and the logical address '402', and so forth up to a storage slot J 620 comprising the physical address '010' and the logical address '410'.

Additionally, the front wall 306 may comprise a first potential storage slot 622 and a second potential storage slot 624. The potential storage slots 622 and 624 may be inaccessible to store data storage media because the storage slots 622 and 624 may not be installed into the frame 206. The library may maintain information about the presence or absence of storage slots so that potential storage slots are not used to store media, until such time as they become actual storage slots. In accordance with the present invention, the first and second potential storage slots 622 and 624 may be assigned a physical address. In one embodiment, the potential storage slots 622, 624 are assigned physical addresses '011' and '012' respectively. The assignment of physical addresses to potential storage slots allows for the potential storage slots to be accessible in the future without disrupting the XY addressability to other physical storage locations as explained in FIG. 3.

For example, a single frame 206 may comprise ten storage slots 602 through 620. Each storage slot is assigned a physical address starting with '001' and ending with '010'. A host (not shown) is configured with five storage elements with a starting element address of '501' and ending with '505'. The host storage element address '502' may contain cartridge identifier ABC001 which is in the storage slot I 618 with physical element address '009'. The library 108 maps the storage element address '502' to the physical address '009'. When the library 108 receives a command to retrieve or store the cartridge identifier in storage element '502', the gripper assembly 318, as explained in FIG. 3, will move to the XY coordinate for physical element '009'.

Often times, storage slots, such as the potential storage slots 622 and 624, are added or removed from the configuration of the library. The addition or removal of potential storage slots 622 and 624 may cause inconsistencies between the host command and the current mapping of the library 108. For example, the potential storage slots 622 and 624 may be inserted after the storage slot D 608 which has the physical address '004'. The addition of the two potential storage slots 622 and 624 causes each subsequent storage slot to possess an altered address. The gripper assembly 318 will move to XY coordinate for physical address '009' which is now the physical element address for the storage slot G 614 which had previously been assigned the physical address '007'.

Assigning physical addresses to the potential storage slots 622 and 624 in accordance with the present invention, the library 108 mapping will remain consistent. The physical addresses will now range from '001' to '012' rather than from '001' to '010'. Adding additional hardware such as the potential storage slots 622 and 624 will not impact the XY coordinate for prior physical addresses. The command to move to '004' as previously explained, will move to the correct location after the potential storage slots 622 and 624 were added because the addition did not affect the XY coordinate for '004'. Subsequently, the potential storage slots 622 and 624 may also be removed from the library 108 without causing inconsistencies in the mapping of the existing physical addresses.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbology employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
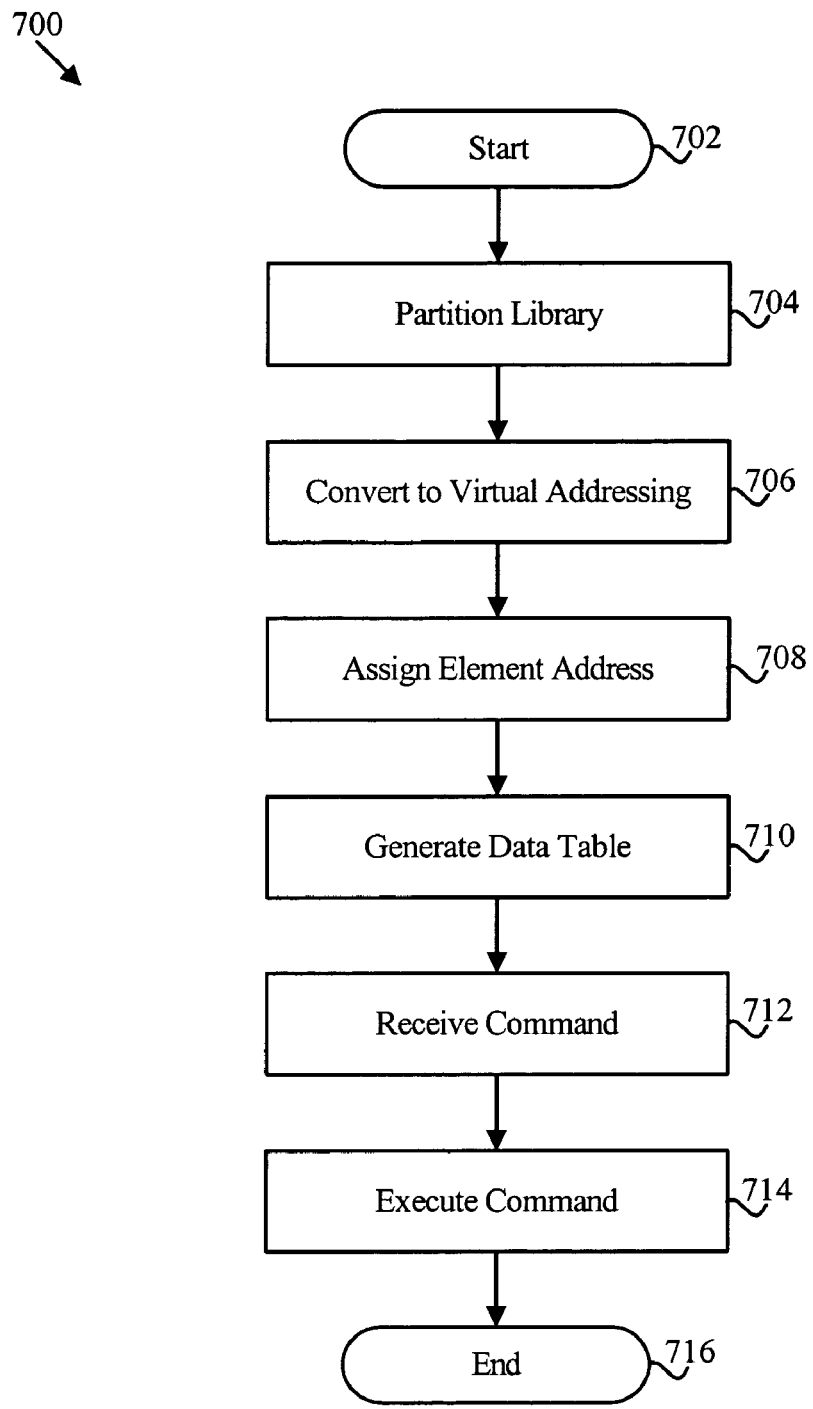
FIG. 7 is a flow chart diagram illustrating one embodiment of a method for managing addresses within a data storage library in accordance with the present invention.

FIG. 7 is a flow chart illustrating an address managing method 700. In one embodiment, the method 700 includes managing physical addresses of storage slots within a data storage library 108. The method 700 starts 702 and partitions 704 the data storage library 108. For example, the data storage library 108 may be logically partitioned into segments. Each of the segments may be associated with a different host application. In one embodiment, the host application is software running on a host computer 106, such as back-up software or any other type of software that accesses the data storage library 108. The various host applications are now enabled to share the various elements of the library 108. The different host applications can only access media stored on the library 108 that correspond to that particular host application.

The method 700 continues and the library 108 is converted 706 from static addressing to virtual addressing as described in U.S. patent application Ser. No. 10/646,234 for Method, System, and Program for Virtualization of Data Storage Library Addresses, filed on Aug. 18, 2003, which is incorporated herein by reference. In one embodiment, virtual addressing rearranges the addresses as a part of the conversion process. The physical addresses are no longer limited to using the number of slots that are physically located within the library 108. In one embodiment, the conversion incorporates using the maximum number of installable storage slots rather than the number of storage slots actually installed within the library 108.

The method 700 continues and storage slots are assigned 708 addresses. In one embodiment, the assignment module 122 assigns physical addresses to the storage slots. As described above, the assignment module 122 may assign an address to a slot that is not yet accessible within the library 706 as explained previously in accordance with FIG. 6.

The method 700 continues and generates 710 a data table 124. In one embodiment, the data table 710 is stored in non-volatile memory 114 located in the data storage library 108. The data table 124 facilitates retaining information associated with each library (physical) storage slot 202. For example, the data table 124 may retain the host (logical) address of each physical storage slot 202.

The data storage library 108 receives 712 a command to retrieve or store a data storage cartridge and the method 700 continues by executing 714 the desired command. The components described in connection with FIG. 5 may facilitate the execution of the command.

As noted earlier, steps of the flowchart may be added, removed, or reordered. For example, step 706 may be eliminated if there is no static to virtual conversion step. In addition, step 708 may occur at library setup or initialization.

Figure 8:
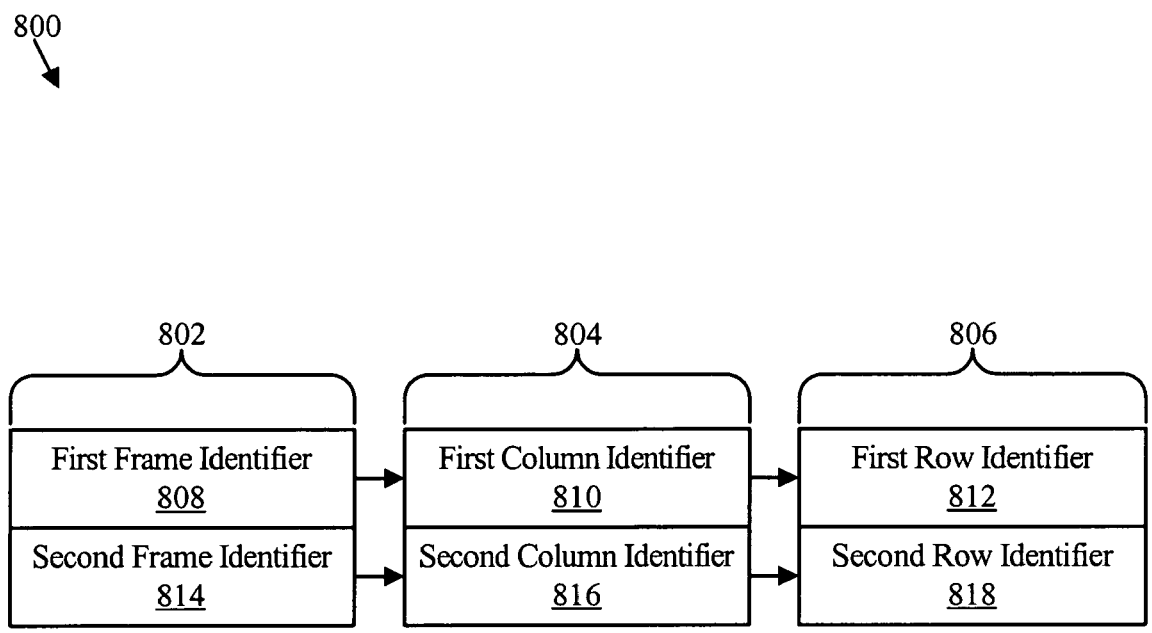
FIG. 8 is a schematic block diagram illustrating one embodiment of an addressing apparatus in accordance with the present invention.

FIG. 8 is a schematic block diagram illustrating one embodiment of an addressing apparatus 800 in accordance with the present invention. The apparatus 800 facilitates assigning an address to existing and non-existing storage slots as previously explained. The apparatus 800 includes frame addresses 802, column addresses 804, and row addresses 806. The frame addresses 802 may be identifiers unique to a particular frame 206 within a data storage library 108. For example, a first frame identifier 808 may include the serial number of that particular frame 206. A second frame identifier 814 may comprise the serial number of a different frame 206 within the library 106.

A first column identifier 810 may identify a particular column of storage slots within the frame 206 identified by the first frame identifier 808. Similarly, a second column identifier 816 identifies a particular column of storage slots within the frame 206 identified by the second frame identifier 814. A first row identifier 812 and a second row identifier 818 identify a particular row of storage slots within the frame 206 identified by the either the first 808 or second frame identifier and 814. A combination of the first frame identifier 808, the first column identifier 810, and the first row identifier 812 will provide an address for a particular storage slot within a particular frame 206 within the library 108. The addressing apparatus 800 further allows for entire frames 206 to be removed or relocated within the library 108 without disrupting the addressing schemes of surrounding frames 206 comprising the library 108.

Figure 9:
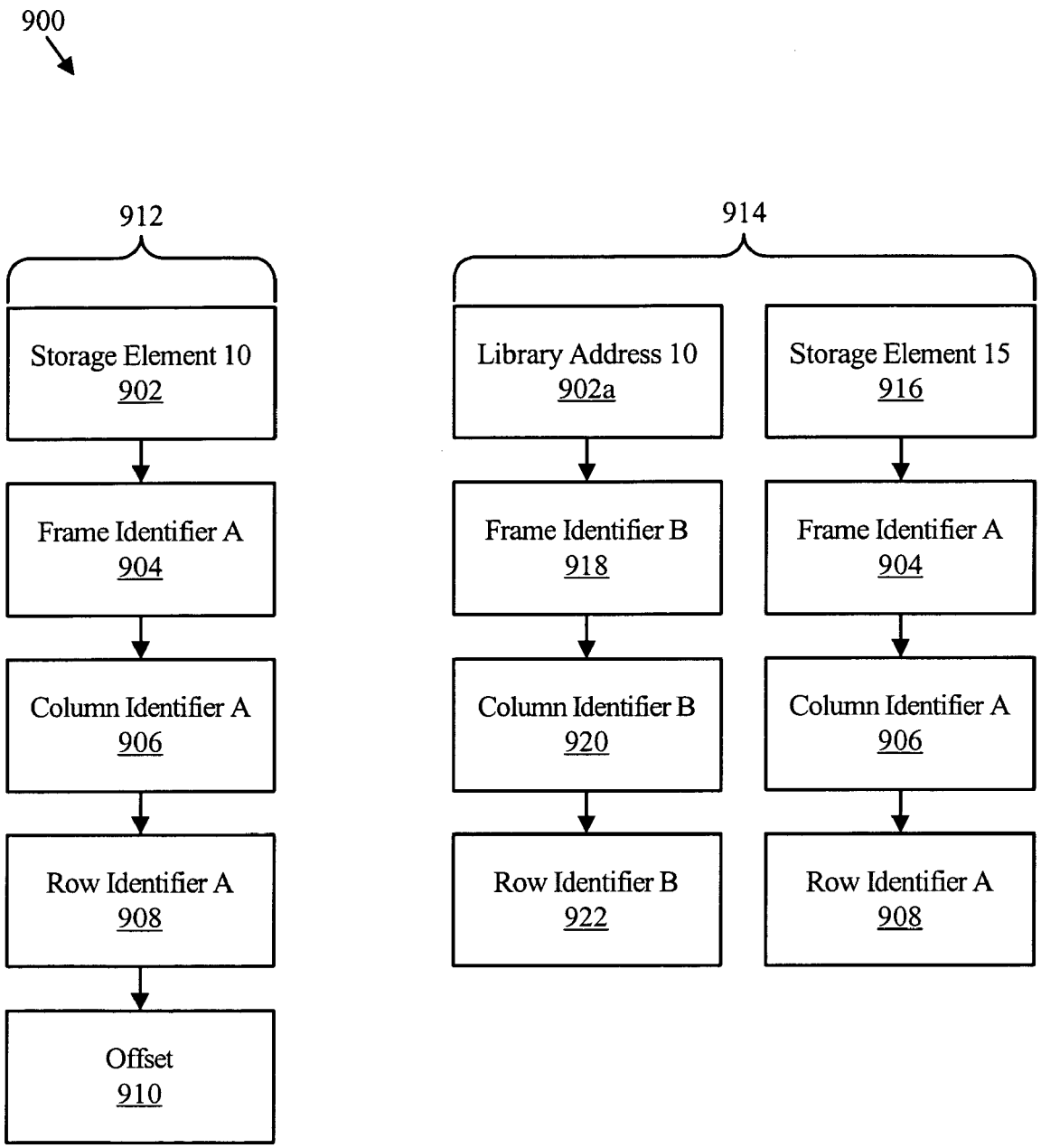
FIG. 9 is a schematic block diagram illustrating one embodiment a security table in accordance with the present invention.

FIG. 9 is a schematic block diagram illustrating one embodiment of a securing table 900 before 912 and after 914 virtualization has been initiated. The security table 900 may comprise a data table stored in the non-volatile memory 114 of the data storage library 108. Before 912 virtualization is implemented, the table 900 includes a storage element 902. In the depicted embodiment, the table 900 includes the storage element 10 902, corresponding to library address 10 and host address 10. The storage element 902 is associated with a frame identifier A 904, a column identifier A 906, and a row identifier A as explained in FIG. 8. For example, the storage element 10 902, (library address 10, host address 10) may be associated with frame 1, column 2, and row 5 within a frame 206. Frame 1, column 2, and row 5 may further be associated with a volser such as ABC 123 that corresponds to a particular external host (not shown). This data is placed in the table 900 at an offset 910 of 15 rather than 10. The offset 910 of 15 is in anticipation of the new library addresses to be assigned for frame, column, and row due to converting from static to dynamic partitioning as explained in FIG. 7.

After 914 virtualization of the library 108, the frame identifier A 904, the column identifier A 906, and the row identifier A 908 may now be associated with a library address 15 1014, but, the host address will remain 10 and will still be associated with volser ABC 123. For example, frame 1, column 2, and row 5 within the frame 206 may now be associated with the library address 15 1014. A library address 10 902a may now be associated with a frame identifier B 918, a column identifier B 920, and a row identifier B 922. For example, the library address 10 902*a* may now be associated with frame 1, column 1, and row 10. Such a library address 10 902*a* may be handled as a potential address if the associated storage slots are not installed.

A host command to scan host address 10, library address 15, as noted above may arrive and the scan will occur at the prior physical location within the library 108, such as frame 1, column 2, and row 5 and still containing volser ABC 123. If the host scan of host address 10, library address 15 1014 returns unreadable, the firmware is enabled to report the contents as having volser ABC 123 and maintain the affinity of the data storage media and the corresponding external host (not shown).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for managing physical addresses of a data storage media, the apparatus comprising:
    a data storage library configured to store the data storage media;
    a library controller configured to receive commands from at least one external host;
    a data table configured to record a mapping of a host address to a library address within the data storage library; and
    an assignment module configured to assign an address to existing and non-existing storage locations within the data storage library, wherein a change to the existence of one or more storage locations does not affect the mapping of the host address to the library address.

2. The apparatus of claim 1, wherein the assignment module is further configured to assign the data storage media with a particular external host.

3. The apparatus of claim 1, wherein the assignment module is further configured to assign an address to each potential storage location within the data storage library.

4. The apparatus of claim 1, wherein the assignment module is further configured to assign an address to non-existent storage locations within the data storage library.

5. The apparatus of claim 1, wherein the data storage library comprises one or more frames.

6. The apparatus of claim 5, wherein the frame comprises columns and rows of storage slots configured to store the data storage media.

7. The apparatus of claim 6, wherein the assignment module is further configured to assign an address location for discrete data storage media based on a particular frame, column, and row.

8. The apparatus of claim 6, wherein the assignment module is further configured to assign a unique frame identifier as the address of the frame.

9. The apparatus of claim 1, wherein the library controller is further configured to receive commands to store or access a particular data storage media.

10. A system for managing physical addresses of data storage media, the system comprising:
    a data storage library configured to store the data storage media;
    one or more external hosts configured to provide commands to store or access the data storage media;
    a data table configured to record a mapping of a host address to a library address within the data storage library; and
    a controller configured to assign addresses to existing and non-existing storage locations within the data storage library, wherein a change to the existence of one or more storage locations does not affect the mapping of the host address to the library address.

11. The system of claim 10, wherein the controller associates the data storage media with a particular external host.

12. The system of claim 10, wherein the controller assigns an address to each potential storage location within the data storage library.

13. The system of claim 10, wherein the controller assigns an address to non-existent storage locations within the data storage library.

14. The system of claim 10, wherein the data storage library comprises one or more frames.

15. The system of claim 14, wherein the frame comprises columns and rows and storage slots configured to store the data storage media.

16. The system of claim 15, wherein the controller further comprises assigning an address location for each data storage media based on the frame, column, and row.

17. The system of claim 16, wherein the controller assigns a unique frame identifier as the address of the frame.

18. A computer readable-medium storing a program of machine-readable instructions executable by a computer to perform operations to manage physical addresses of data storage media, the operations comprising:
    providing instructions to store or access the data storage media;
    providing instructions to assign an address to existing and non-existing storage locations within a data storage library, wherein a change to the existence of one or more storage locations does not affect a mapping of the addresses; and
    recording the address of the data storage media.

19. The computer-readable medium of claim 18, wherein the instructions further comprise operations to associate the data storage media with a particular external host.

20. The computer-readable medium of claim 18, wherein the instructions further comprise operations to assign an address to each potential storage location within the data storage library.

21. The computer-readable medium of claim 18, wherein the instructions further comprise operations to assign unique identifiers of the components within the data storage library as the address of the components.

22. The computer-readable medium of claim 18, wherein the instructions further comprise operations to provide storage slots arranged in columns and rows to store the data storage media.

23. The computer-readable medium of claim 18, wherein the instructions further comprise operations to assign an address for each storage slot based on the column and row of the corresponding slot.

24. A computer readable storage medium comprising computer readable code executable by a computer to carry out a method for managing addresses of data storage media within a data storage library, the method comprising;
    storing data storage media within the data storage library;
    mapping a host address to a library address within the data storage library; and
    assigning an address to existing and non-existing storage locations within the data storage library, wherein a change to the existence of one or more storage locations does not affect the mapping of the host address to the library address.

25. The computer readable storage medium of claim 24, wherein the method further comprises associating the data storage media with a particular external host.

26. The computer readable storage medium of claim 24, wherein the method further comprises assigning an address to each frame comprising the data storage library.

27. The computer readable storage medium of claim 24, wherein the method further comprises assigning a unique identifier of the frame as the address of the frame.

28. A method for managing physical addresses of data storage media within a data storage library, the method comprising:
   storing data storage media within the data storage library;
   assigning an address to existing and non-existing storage locations within the data storage library;
   mapping a host address to a library address within the data storage library; and
   assigning an address to existing and non-existing storage locations within the data storage library, wherein a change to the existence of one or more storage locations does not affect the mapping of the host address to the library address.

29. The method of claim 28, further comprising associating the data storage media with a particular external host.

30. An apparatus to for managing physical addresses of data storage media within a data storage library, the apparatus comprising:
   means for storing data storage media within the data storage library;
   means for assigning an address to existing and non-existing storage locations within the data storage library;
   means for mapping a host address to a library address within the data storage library; and
   means for assigning an address to existing and non-existing storage locations within the data storage library, wherein a change to the existence of one or more storage locations does not affect the mapping of the host address to the library address.

* * * * *